United States Patent
Lee et al.

(10) Patent No.: US 9,450,258 B2
(45) Date of Patent: Sep. 20, 2016

(54) HYDROGEN CONCENTRATION CONTROL DEVICE AND METHOD FOR FUEL CELL SYSTEM

(75) Inventors: Dong Hun Lee, Gyeonggi-do (KR); Seo Ho Choi, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 611 days.

(21) Appl. No.: 13/484,786

(22) Filed: May 31, 2012

(65) Prior Publication Data

US 2013/0137007 A1    May 30, 2013

(30) Foreign Application Priority Data

Nov. 30, 2011  (KR) .................. 10-2011-0126961

(51) Int. Cl.
*H01M 8/04* (2016.01)
*H01M 8/10* (2016.01)

(52) U.S. Cl.
CPC ..... *H01M 8/04447* (2013.01); *H01M 8/04798* (2013.01); *H01M 2008/1095* (2013.01); *H01M 2250/20* (2013.01); *Y02E 60/50* (2013.01); *Y02T 90/32* (2013.01)

(58) Field of Classification Search
None
See application file for complete search history.

(56) References Cited

U.S. PATENT DOCUMENTS

| | | | | |
|---|---|---|---|---|
| 2004/0104342 A1* | 6/2004 | Yamada | ............ | H01M 8/04082 250/288 |
| 2006/0110640 A1* | 5/2006 | Yoshida et al. | .................. | 429/25 |
| 2007/0243437 A1* | 10/2007 | Katano | ............................ | 429/25 |
| 2008/0070090 A1 | 3/2008 | Yoshizumi et al. | | |

FOREIGN PATENT DOCUMENTS

| | | |
|---|---|---|
| CN | 1802766 A | 7/2006 |
| JP | 2004055287 A | 2/2004 |
| JP | 2006-309948 A | 11/2006 |
| JP | 2006309948 A | 11/2006 |
| JP | 2007-220343 A | 8/2007 |
| JP | 2007220400 A | 8/2007 |
| KR | 10-0796151 | 1/2008 |
| KR | 10-1049920 | 11/2008 |

* cited by examiner

*Primary Examiner* — Patrick Ryan
*Assistant Examiner* — Christopher Domone
(74) *Attorney, Agent, or Firm* — Mintz Levin Cohn Ferris Glovsky and Popeo, P.C.; Peter F. Corless

(57) ABSTRACT

Disclosed is a device and method for controlling hydrogen concentration of a fuel cell system to maintain the concentration of hydrogen of an anode at a proper level in accordance with the concentration supplied to a fuel cell. More specifically, a hydrogen concentration measuring sensor is directly provided in a hydrogen storage device, the hydrogen concentration and the impurity concentration in an anode channel of the fuel cell system are estimated based on a measured hydrogen concentration, and when it is determined that the hydrogen concentration in the anode channel falls under a reference value at which the fuel cell system can be stably operated, purge control for discharging the gases (hydrogen and impurities) in the anode channel to the outside is performed, so that the hydrogen concentration in the anode channel of the fuel cell system can be maintained equal to or higher than the reference value.

12 Claims, 5 Drawing Sheets

HYDROGEN CONCENTRATION CONTROL DEVICE AND METHOD FOR FUEL CELL SYSTEM

CROSS-REFERENCE TO RELATED APPLICATION

This application claims under 35 U.S.C. §119(a) the benefit of Korean Patent Application No. 10-2011-0126961 filed on Nov. 30, 2011, the entire contents of which are incorporated herein by reference.

BACKGROUND (a) Technical Field

The present invention relates to a hydrogen concentration control device and method for a fuel cell system. More particularly, the present invention relates to a hydrogen concentration control device and method for a fuel cell system, which are adapted to maintain the hydrogen concentration of an anode in the fuel cell system at a proper level in accordance with the concentration of hydrogen supplied to the fuel cell of the fuel cell system.

(b) Background Art

A fuel cell system typically includes a hydrogen supply system and an oxygen supply system for supplying reactant gases (hydrogen and oxygen in the air); a fuel cell stack for electrochemically converting chemical energy derived from an oxidation and reduction reaction of the reactant gases into electric energy to generate heat as a product of the reaction, and electric energy; and a water and heat management system for cooling the fuel cell stack.

Among these components of the fuel cell system, the fuel cell stack for practically generating electricity has a stacked structure of tens to hundreds of unit cells, each of which is comprised of a membrane electrode assembly (MEA) (which may also be referred to as an electrode-membrane assembly or an electrode-membrane joint body), and a separator, in which a pair of end plates are mounted on the opposite ends of the fuel cell stack to fix the individual stacked components together with a predetermined face pressure as well as to conduct electricity collection.

The MEA includes a polymer electrolyte membrane, an anode and a cathode which are arranged with the polymer electrolyte membrane interposed therebetween, in which the anode (which may also be referred to as a hydrogen electrode, a fuel electrode, a negative-pole electrode, or an oxidation electrode) and the cathode (which may also be referred to as an air electrode; an oxygen electrode, a positive-pole electrode, or a reduction electrode) are fabricated by adsorbing a catalytic layer containing nano-sized particles of catalysts onto a backing layer.

Now, the electricity generation principle of such a fuel cell system will be briefly described. As hydrogen is supplied to the anode of the fuel cell stack, an oxidation reaction of the hydrogen is initiated on the anode, thereby producing hydrogen ions (protons) and electrons. The hydrogen ions and electrons produced thereby are moved to the cathode through an electrolyte membrane and a separator. Then, water is produced on the cathode through an electrochemical reaction between the hydrogen ions and electrons moved from the anode and oxygen in the air, and the electric energy finally generated from the currency of such electrons is supplied to a load (e.g., a motor for driving a fuel cell vehicle), that requires the electric energy, through an electricity collector of the end plates.

Meanwhile, a conventional hydrogen concentration control technology for maintaining the hydrogen concentration of the anode of a fuel cell stack at a proper level by measuring the concentration of hydrogen supplied to the anode has been applied to various conventional hydrogen supply systems for supplying hydrogen using a modifier. For example, the conventional control technology confirms and controls the concentration of hydrogen produced through such a modifier and the content of impurities in the hydrogen so that hydrogen is supplied with a concentration equal to or higher than a reference concentration. If impurities harmful to the catalytic layer are contained in the hydrogen, the driving of the hydrogen supply system is stopped.

In addition, another conventional hydrogen concentration control technology has been applied to a hydrogen supply system. The conventional hydrogen concentration control technology measures the impedance of a fuel cell stack to determine the hydrogen concentration in the anode channel of the fuel cell on the basis of the measured impedance. When the hydrogen concentration is lower than a reference value, the conventional hydrogen control technology maintains the hydrogen concentration through the purge control of the anode. However, there is a difficulty in precisely measuring the hydrogen concentration by measuring the impedance from a fuel cell vehicle, of which the fuel cell practically suffers from continuous variation in current load. In particular, there is a problem in that the fuel cell should be necessarily equipped with an expensive impedance measuring device.

Still another conventional technology has been applied, in which the conventional technology provides a hydrogen concentration measuring sensor in either a hydrogen recirculation tube or at an outlet end of an anode of a fuel cell stack to confirm the concentrations of hydrogen and impurities of the anode. This technology confirms the power state of each of unit cells of the fuel cell stack. When the power is lower than a reference value due to excessive impurities in the corresponding unit cell, the conventional technology performs hydrogen purge to remove the impurities.

In this embodiment, however, when the hydrogen concentration is confirmed in the recirculation tube side, there is a difficulty in practically applying the conventional technology because the recirculated quantity of hydrogen is not uniform in accordance with the operating conditions of the fuel cell, and it is very difficult to precisely measure the hydrogen concentration under the influence of condensation water. Furthermore, there is a sufficiently high possibility that damage and durability reduction may still occur to the anode in this technology because the hydrogen purge process is often performed after the problem has already occurred. In addition, because a large quantity of condensation water actually exists at the outlet end of the fuel cell anode, which makes it difficult for the hydrogen concentration measuring sensor to normally operate at the outlet end, and because the probability of measurement error and breakdown of the sensor caused due to the water is very high, it is hard to apply this conventional technology to an actual product.

Yet another conventional technology has been applied, in which the conventional technology provides a hydrogen concentration measuring sensor in a hydrogen recirculation tube to confirm the concentration of impurities in an anode channel, and then performs hydrogen purge control on the basis of this confirmation. However, since a large quantity of condensation water exists in the recirculation tube, it is difficult to measure the hydrogen concentration under most circumstances. In addition, again it is very likely that the above process will be performed after an electrode of the fuel cell has already been damaged due to the impurities in the anode, and thus as a result the durability of anode is again greatly effected as a result.

SUMMARY OF THE DISCLOSURE

The present invention provides a hydrogen concentration control device and method for a fuel cell system, wherein a hydrogen concentration measuring sensor is directly provided in hydrogen storage device (e.g., a hydrogen tank), the hydrogen concentration and the impurity concentration in an anode channel of the fuel cell system are estimated on the basis of a measured hydrogen concentration, and when it is determined that the hydrogen concentration in the anode channel falls below a reference value at which the fuel cell system can be stably operated, purge control is performed for discharging the gases (hydrogen and impurities) in the anode channel to the outside so that the hydrogen concentration in the anode channel of the fuel cell system can be maintained to be not lower than the reference value.

In one aspect, the present invention provides a hydrogen concentration control device for a fuel cell system having a hydrogen supply system for supplying hydrogen to an anode of a fuel cell. The exemplary hydrogen concentration control device includes a hydrogen concentration measuring sensor directly mounted in a hydrogen storage device (e.g., a hydrogen tank of the hydrogen supply system or a hydrogen supply tube connected between the hydrogen tank and the anode); and a controller. The controller is configured to estimate the hydrogen concentration in the anode channel on the basis of the hydrogen concentration measured by the hydrogen concentration measuring sensor, and perform purge control for the gases in the anode channel by opening a hydrogen purge valve when it is determined that the estimated hydrogen concentration is reduced below a reference value.

In another aspect, the present invention provides a method of controlling hydrogen concentration of a fuel cell system including: measuring hydrogen concentration in a hydrogen tank or hydrogen supply tube; estimating change in hydrogen concentration in the anode channel and impurity concentration on the basis of the measured hydrogen concentration; and performing hydrogen purge by opening a hydrogen purge valve for a predetermined length of time when it is determined that the impurity concentration in the anode channel is not less than an upper limit of reference value (β), so that hydrogen and impurities can be discharged to the outside.

Through the above features, the present invention provides following effects.

In accordance with the present invention, a hydrogen concentration measuring sensor is directly provided at a specific position in a hydrogen tank or a hydrogen supply tube, the hydrogen concentration and the impurity concentration in an anode channel of the fuel cell system are estimated on the basis of a measured hydrogen concentration, and when it is determined that the hydrogen concentration in the anode channel fails below a reference value for hydrogen at which the fuel cell system can be stably operated. In other words, when it is determined that the impurity concentration has increased over a predetermined reference value, purge control is performed for discharging the gases (hydrogen and impurities) in the anode channel to the outside. As a result, the hydrogen concentration in the anode channel of the fuel cell system can be maintained at or higher than the reference value for hydrogen.

In addition, regardless of the concentration of hydrogen charged in the hydrogen tank, purge control is performed for maintaining the hydrogen concentration in the anode channel at a proper level by estimating the hydrogen concentration and the impurity concentration in the anode channel on the basis of the hydrogen concentration measured by the hydrogen concentration measuring sensor provided in the hydrogen tank. That is, even when hydrogen is charged with different concentrations from regional hydrogen station to regional hydrogen station, purge control is performed. As a result, it is possible to secure the stable operation of the fuel cell system and prevent damage to the anode and reduction of its durability.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

DETAILED DESCRIPTION

Hereinafter reference will now be made in detail to various embodiments of the present invention, examples of which are illustrated in the accompanying drawings and described below.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g., fuels derived from resources other than petroleum).

It is well understood that the performance of a polymer electrolyte fuel cell system is directly affected by the concentration of hydrogen supplied to the anode of the fuel cell system, in which when the purity of supplied hydrogen is low, voltage obtained at the same current on a voltage-current characteristic curve is also low. Furthermore, when the concentration is reduced below a predetermined level, hydrogen becomes sparse at the channel outlet end of the anode, which causes the voltage of the fuel cell to rapidly drop due to the loss of hydrogen concentration.

In particular, because the hydrogen concentrations of all the regional hydrogen stations cannot be equal to each other, it is absolutely necessary to develop a control technology that can stably maintain the performance of a fuel cell in accordance with the concentration of hydrogen supplied to an anode of a fuel cell stack.

For this purpose, the present invention places emphasis on enabling the hydrogen concentration in the anode channel of the fuel cell system to be maintained at a level equal to or higher than a reference value required for stably operating the fuel cell system by estimating the hydrogen concentration in the anode channel in accordance with an operating condition of the fuel cell based on the hydrogen concentration measured when a device capable of measuring the hydrogen concentration is provided in a rechargeable hydrogen storage tank or a hydrogen supply tube, and by performing purge control for discharging the gas (hydrogen and impurities) within the anode to the outside when it is determined that the hydrogen concentration in the anode channel is reduced below the reference value.

Figure 1:
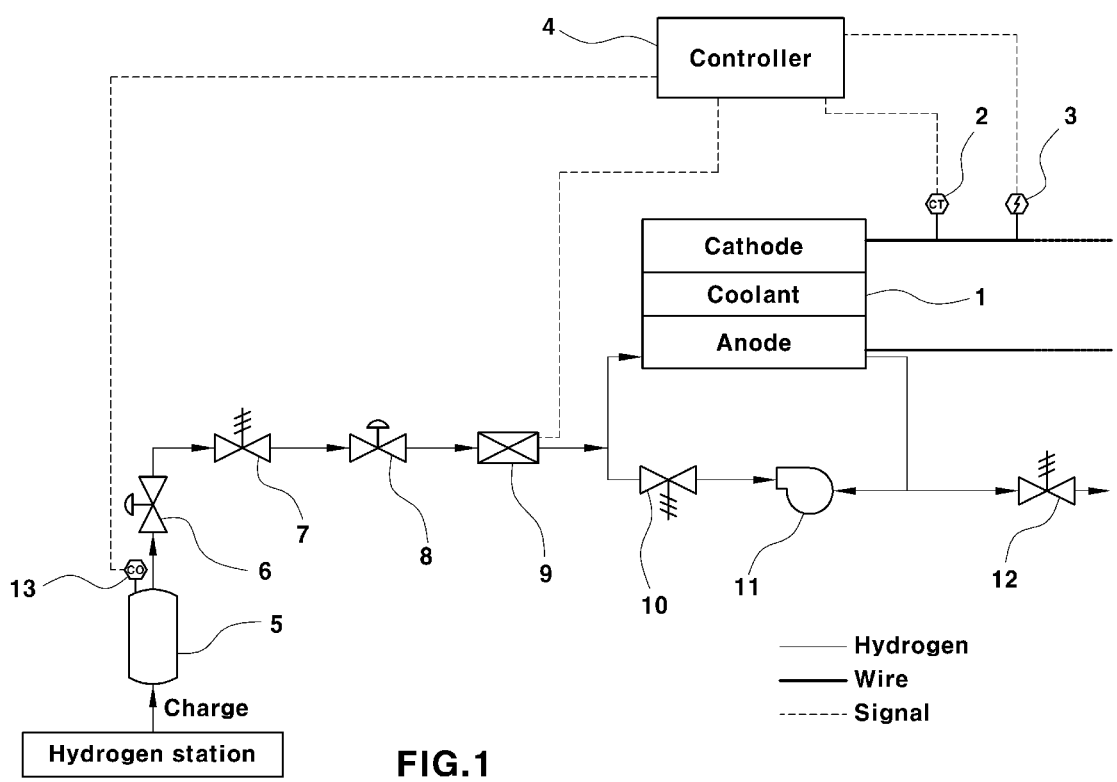
FIGS. 1 and 2 are schematic views, each of which shows a construction of the hydrogen concentration control device for a fuel cell system of the exemplary embodiment of the present invention.
Figure 2:
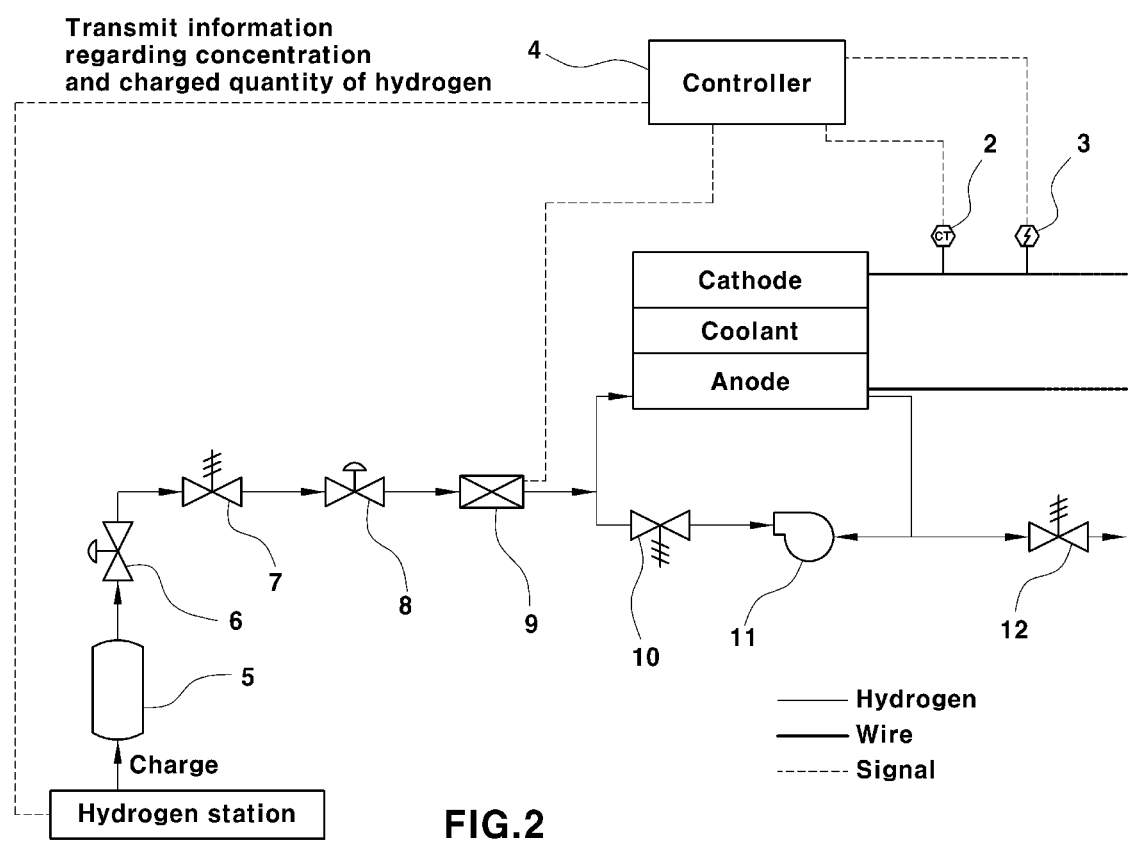

FIG. 1 is a schematic view showing a construction of the hydrogen concentration control device for a fuel cell system of exemplary embodiment of the present invention, a hydrogen supply system for supplying hydrogen to an anode of a fuel cell stack, and a hydrogen recirculation system for recirculating hydrogen to the anode are shown. More specifically, a current sensor 2 and a voltage sensor 3 are configured to measure the current and voltage of the electricity generated by the fuel cell stack, respectively.

Referring to the construction and operation of the hydrogen supply device step by step; the concentration is controlled by (1) discharging the hydrogen in a hydrogen tank 5 while regulating the hydrogen to a predetermined pressure by a high pressure regulator 6, (2) allowing the discharged hydrogen to flow through a solenoid valve 7 which is in the opened state while the fuel cell system is being operated; (3) regulating the hydrogen, which has passed the solenoid valve 7, to a predetermined pressure again by a low pressure regulator 8, and (4) supplying the hydrogen, which has passed the low pressure regulator 8, to the anode of the a fuel cell stack 1, the flow rate of the hydrogen supplied to the anode being measured by a flow meter 9.

The hydrogen supplied to the anode of the fuel cell stack in this manner reacts with oxygen in the air to generate electricity, and then a portion of non-reacted hydrogen is recirculated to an inlet side of the anode through a solenoid valve 10, e.g., a hydrogen recirculation valve, by driving a hydrogen circulation blower 11 of the hydrogen recirculation system, and the remainder of the non-reacted hydrogen is discharged to the outside through a solenoid valve 12, e.g., a hydrogen purge valve.

Advantageously, the present invention enables the fuel cell system to be stably operated despite of the variations in concentration of the hydrogen supplied from the hydrogen tank 5 by variably controlling the quantity of purged hydrogen and impurities in accordance with the hydrogen concentration in the hydrogen storage device 5 when the hydrogen stored in the hydrogen storage device 5 is supplied to the anode channel through the hydrogen supply tube.

The concentration of hydrogen charged in the hydrogen storage device 5 is varied whenever hydrogen is charged because regional hydrogen stations have different hydrogen concentrations. Unless the variation in concentration of hydrogen charged to the hydrogen storage device 5 is considered, the concentration of hydrogen supplied to the anode of the stack 1 from the hydrogen tank is also varied, which causes the performance of the fuel cell to be changed, sometimes detrimentally.

That is, when the hydrogen concentration in the hydrogen tank 5 is too low, the voltage of the fuel cell abruptly drops, which may cause an anode electrode to be damaged from reverse voltage. The damage to the electrode may deteriorate the performance of the fuel cell and may cause a problem in terms of durability and longevity.

In order to solve the above-mentioned problems, the present invention directly mounts a hydrogen concentration measuring sensor 13 at a specific position in the hydrogen storage device 5 (e.g., a hydrogen tank or the hydrogen supply tube, estimates the hydrogen concentration in the anode channel on the basis of the hydrogen concentration in the hydrogen tank 5 measured by the hydrogen concentration measuring sensor 13, and discharges the gases (e.g., the hydrogen and impurities) in the anode to the outside through purge control when it is determined that the hydrogen concentration in the anode channel is reduced below a reference value for hydrogen at which the fuel cell system can be stably operated. Thus, when it is determined that the concentration of impurities is higher than a reference value for impurities, that gases in the anode channel are purged so that the hydrogen concentration in the anode channel can be maintained equal to or higher than the reference value for hydrogen and the impurity concentration can be maintained below the reference value for impurities.

In accordance with another embodiment of the present invention, no hydrogen concentration measuring sensor is provided in the hydrogen storage device. In such a case, as long as new hydrogen is not charged again, the concentration of hydrogen charged in the hydrogen storage device is not varied. Therefore, when new hydrogen is charged from a hydrogen station, the controller 4 may receive information regarding the concentration and charged quantity of the new hydrogen directly from the hydrogen station through a wired or wireless communication means, and calculate the current hydrogen concentration in the hydrogen storage device together with information regarding the quantity and concentration of hydrogen remaining in the hydrogen storage device before the new hydrogen is charged into the system.

After the hydrogen concentration is measured by the hydrogen concentration measuring sensor provided in the hydrogen storage device (i.e., a hydrogen tank or the hydrogen supply tube) or the current hydrogen concentration in the hydrogen is measured using the information directly obtained from a hydrogen station regarding the concentration and charged quantity of hydrogen, the change in hydrogen concentration in the anode channel of the fuel cell system and the impurity concentration is estimated based on the measured hydrogen concentration.

Now, estimation of the change in hydrogen concentration in the anode channel of the fuel cell system and impurity concentration therein will be described in more detail.

In order to estimate the change in hydrogen concentration in the anode channel and the impurity concentration therein during the operation of the fuel cell system, the entirety of the anode channel should preferably be set as a single control volume.

Figure 3:
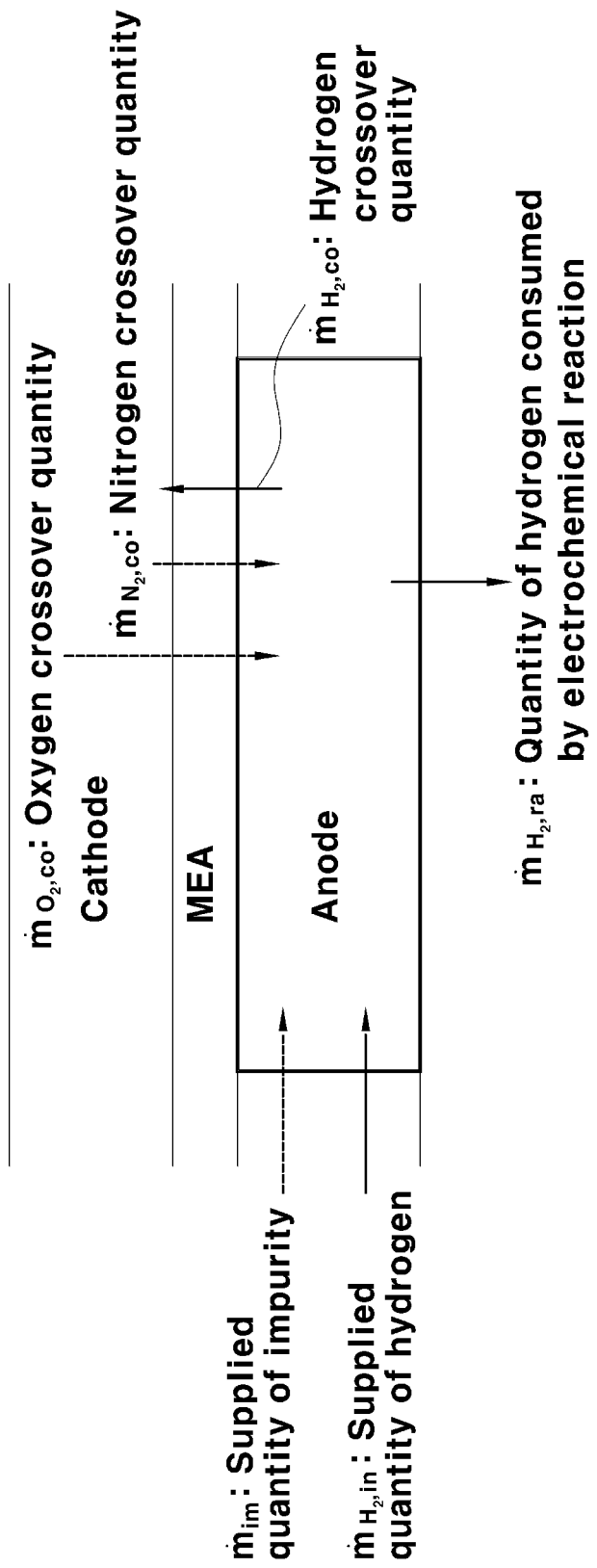
FIG. 3 is schematic view for describing how movements of substances are implemented in relation to an anode channel of a fuel cell of the exemplary embodiment of the present invention.
Figure 4:
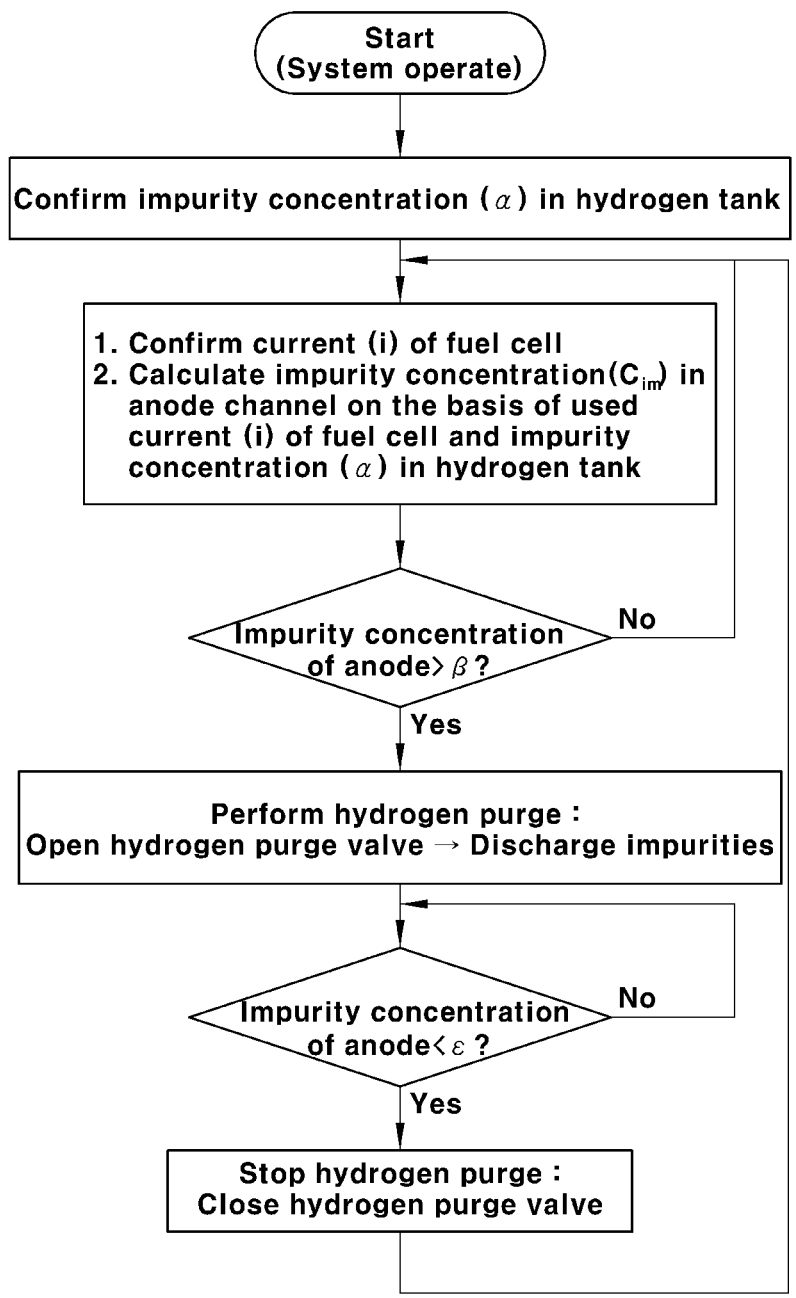
FIG. 4 is a flowchart for describing the inventive hydrogen concentration control method for a fuel cell system of the exemplary embodiment of the present invention.

FIG. 3 shows transmitting courses of individual substances flowing between the inside and outside of the anode channel set as the single control volume. As shown in FIG. 3, in the anode, hydrogen is consumed through an electrochemical reaction, wherein hydrogen ($\dot{m}_{H_2,in}$) and impurities ($\dot{m}_{im}$) are supplied to the anode from the hydrogen storage device 5 by the consumed quantity of hydrogen ($\dot{m}_{H_2,ra}$).

In addition, as crossover occurs through a membrane electrode assembly (MEA) due to the difference in concentration between the gases supplied to the anode and the cathode during the operation of the fuel cell system, oxygen ($\dot{m}_{O_2 \cdot co}$) and nitrogen ($\dot{m}_{N_2 \cdot co}$) are transmitted to the anode from the cathode, and hydrogen ($\dot{m}_{H_2 \cdot co}$) is transmitted to the cathode from the anode.

Based on these supplied quantities and crossover quantities of individual substances flowing between the inside and outside of the anode channel set as the single control volume, the impurity concentration ($C_{im}$) in the anode channel, which is changed over time, may be expressed as Equation 1 below.

$$C_{im} = \frac{m_{im \cdot an} + \int (\dot{m}_{im} \dot{m}_{O_2 \cdot co} + \dot{m}_{N_2 \cdot co}) dt}{m_{H_2 \cdot an} + m_{im \cdot an} + \int (\dot{m}_{H_2 \cdot in} + \dot{m}_{im} - \dot{m}_{H_2 \cdot ra} + \dot{m}_{O_2 \cdot co} + \dot{m}_{N_2 \cdot co} - \dot{m}_{H_2 \cdot co}) dt}$$

Equation 1

In Equation 1, $m_{H_2 \cdot an}$ and $m_{im \cdot an}$ indicate the initial quantities of hydrogen and impurities in the anode channel, respectively, wherein the impurity concentration means a mole concentration, and the quantity of each substance means the number of moles.

Assuming that there is no change in pressure in the control volume, the sum of the quantity of hydrogen ($\dot{m}_{H_2 \cdot in}$) and the quantity of impurities ($\dot{m}_{im}$) supplied to the inlet of the anode becomes equal to the sum of the quantity of hydrogen ($\dot{m}_{H_2 \cdot ra}$) consumed by the electrochemical reaction and the crossover quantities of substances flowing through the MEA. However, because the crossover quantities are very small, the term of the crossover quantities can be ignored. Consequently, assuming that there is no change in pressure in the control volume, the sum of the quantity of hydrogen ($\dot{m}_{H_2 \cdot in}$) and the quantity of impurities ($\dot{m}_{im}$) supplied to the inlet of the anode is substantially equal to the quantity of hydrogen ($\dot{m}_{H_2 \cdot ra}$) consumed by the electrochemical reaction.

In order to simplify Equation 1, the sum of the quantities of oxygen and nitrogen moved due to the crossover may be expressed as Equation 2 below.

$$\dot{m}_{im,co} = \dot{m}_{O_2,co} + \dot{m}_{N_2,co}$$

Equation 2

As being proportional to the consumed current of the fuel cell (i), the quantity of hydrogen ($\dot{m}_{H_2 \cdot ra}$) consumed by the electrochemical reaction may be expressed as Equation 3 below.

$$\dot{m}_{H_2,ra} = Ai,$$

Equation 3

In addition, assuming that the impurity concentration in the hydrogen storage device is $\alpha$, the quantities of impurities and hydrogen supplied to the anode may be expressed as Equations 4 and 5 below.

$$\dot{m}_{H_2,in} = (1-\alpha)Ai$$

Equation 4

$$\dot{m}_{im} = \alpha Ai$$

Equation 5

Therefore, when Equations 2 to 5 are substituted into Equation 1, Equation 1 for calculating the impurity concentration in the anode channel may be simplified and expressed as Equation 6 below.

$$C_{im} = \frac{m_{im \cdot an} + \alpha A \int i \, dt + \int \dot{m}_{im \cdot co} dt}{m_{H_2 \cdot an} + m_{im \cdot an}}$$

Equation 6

In accordance with the present invention, the impurity concentration ($C_{im}$) in the anode channel according to the impurity concentration ($\alpha$) in the hydrogen storage device 5 is calculated using Equation 6, and when it is determined that the impurity concentration) ($C_{im}$) is equal to or higher than an upper limit of reference concentration ($\beta$) previously obtained through a test or the like, the hydrogen purge valve 12 is opened for a predetermined length of time to perform hydrogen purge so that the impurities can be discharged.

Preferably, the hydrogen purge valve 12 is opened (via electronic control) so that the impurities can be discharged until the impurity concentration in the anode channel is reduced below a lower limit of reference concentration ($\epsilon$), and when it is determined that the impurity concentration in the anode channel is reduced below the lower limit of reference concentration ($\epsilon$), the hydrogen purge valve 12 is closed to stop the hydrogen purge.

Although the above exemplary embodiment is described as using a single controller to perform the above process, it is understood that the above processes may also be performed by a plurality of controllers or control units.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 5:
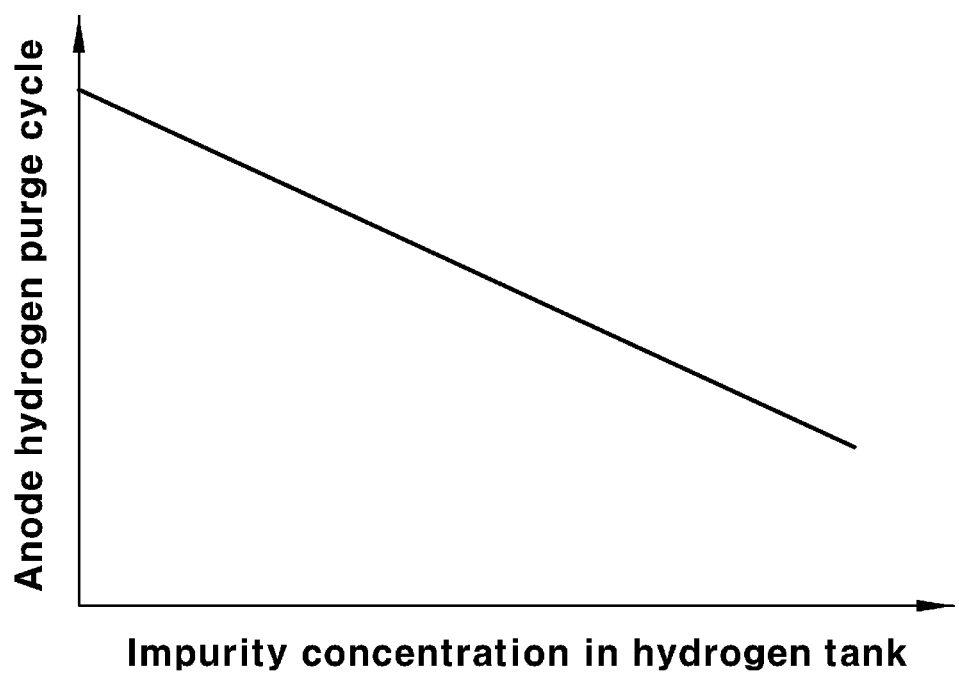
FIG. 5 is a graph showing hydrogen purge cycles performed in the anode channel in accordance with the present invention of the exemplary embodiment of the present invention.

Meanwhile, as the increase of the impurity concentration in the anode channel over time is proportional to the impurity concentration in the hydrogen storage device, the impurity concentration in the anode channel is rapidly increased over time when the impurity concentration in the hydrogen storage device is high. Therefore, as shown in FIG. 5, it is desirable to increase hydrogen purge cycles in proportion to the impurity concentration in the hydrogen storage device 5.

Like this, by directly providing a hydrogen concentration measuring sensor at a specific position in the hydrogen storage device (e.g., the hydrogen tank or the hydrogen supply tube), estimating the hydrogen concentration in the anode channel on the basis of the hydrogen concentration in the hydrogen storage device measured by the hydrogen concentration measuring sensor, and discharging the gases (hydrogen and impurities) in the anode to the outside through purge control when it is determined that the hydrogen concentration in the anode channel is reduced below a reference value for hydrogen at which the fuel cell system can be stably operated, the hydrogen concentration in the anode channel can be maintained at a level equal to or higher than the reference value for hydrogen, and the impurity concentration can be maintained below the reference value for impurities. As a result, it is possible to secure the stable operation of the fuel cell system.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A hydrogen concentration control device for a fuel cell system having a hydrogen supply system for supplying hydrogen to an anode of a fuel cell, the device comprising:
   a hydrogen concentration measuring sensor directly disposed in a hydrogen tank of the hydrogen supply system or in a hydrogen supply tube connected between the hydrogen tank and the anode to measure a hydrogen concentration in the hydrogen tank; and
   a controller configured to estimate the hydrogen concentration in the anode channel based on the hydrogen concentration in the hydrogen tank measured by the hydrogen concentration measuring sensor and a crossover quantity of impurities, and perform purge control of gases in the anode channel by opening a hydrogen purge valve when the controller determines that the estimated hydrogen concentration in the anode channel has fallen below a reference value,
   wherein the crossover quantity of the impurities comprises quantities of oxygen and nitrogen that are transmitted to the anode from the cathode.

2. A hydrogen concentration control device for a fuel cell system having a hydrogen supply system for supplying hydrogen to an anode of a fuel cell, the device comprising:
   a controller configured to estimate a hydrogen concentration in the anode channel, and perform purge control of gases in the anode channel by opening a hydrogen purge valve when the controller determines that the estimated hydrogen concentration has fallen below a reference value; and
   a wired or wireless communication device configured to transmit information regarding concentration and charged quantity of hydrogen from a hydrogen station;
   wherein the controller estimates a hydrogen concentration in the hydrogen tank based on the information regarding the concentration and charged quantity of hydrogen obtained from the wired or wireless communication device, and then estimates the hydrogen concentration in the anode channel based on the hydrogen concentration in the hydrogen tank and a crossover quantity of impurities,
   wherein the crossover quantity of the impurities comprises quantities of oxygen and nitrogen that are transmitted to the anode from the cathode.

3. A hydrogen concentration control method for a fuel cell system, the method comprising:
   measuring, by a sensor, hydrogen concentration in a hydrogen tank;
   estimating, by a controller, change in hydrogen concentration in the anode channel and impurity concentration therein on the basis of the measured hydrogen concentration in the hydrogen tank and a crossover quantity of impurities; and
   determining, by the controller, whether the estimated hydrogen concentration in the anode channel has fallen below a predetermined reference value;
   in response to determining that the hydrogen concentration in the anode channel has fallen below a predetermined reference value, performing hydrogen purge by opening a valve for a predetermined length of time so that hydrogen and impurities are discharged to the outside,
   wherein the crossover quantity of the impurities comprises quantities of oxygen and nitrogen that are transmitted to the anode from the cathode.

4. The method of claim 3, wherein estimating the change in hydrogen concentration in the anode channel and impurity concentration further comprises calculating the impurity concentration ($C_{im}$) according to the impurity concentration ($\alpha$) using an equation defined by $$C_{im} = \frac{m_{im\text{-}an} + \alpha A \int i dt + \int \dot{m}_{im\text{-}co} dt}{m_{H_2\text{-}an} + m_{im\text{-}an}}$$

wherein the equation is obtained by setting an entirety of the anode channel as a single control volume.

5. The method of claim 3, wherein the hydrogen purge is performed until the impurity concentration in the anode channel is reduced below the lower limit of reference value ($\epsilon$), and when the impurity concentration in the anode channel is reduced below a lower limit of reference value, the hydrogen purge valve is closed to stop the hydrogen purge.

6. The method of claim 3, wherein when the impurity concentration in the hydrogen tank is higher than a reference value for impurities, hydrogen purge cycles are increased in proportion to the impurity concentration in the hydrogen tank.

7. A hydrogen concentration control device, the device comprising:
   a sensor directly disposed in a hydrogen storage device of a hybrid vehicle and configured to measure the concentration of hydrogen in a hydrogen storage device; and
   a controller configured to estimate a hydrogen concentration in an anode channel of a fuel cell based on the hydrogen concentration in the hydrogen storage device measured by the sensor and a crossover quantity of impurities, and perform purge control of gases in the anode channel by opening a valve when the controller estimates that the hydrogen concentration in the anode channel has fallen below a reference value,
   wherein the crossover quantity of the impurities comprises quantities of oxygen and nitrogen that are transmitted to the anode from the cathode.

8. The hydrogen concentration control device of claim 1, wherein the hydrogen concentration control device is installed in a vehicle.

9. A hydrogen concentration control method for a fuel cell system, comprising:
   transmitting, by a wired or wireless communication device, information regarding concentration and charged quantity of hydrogen from a hydrogen station
   estimating, by a controller, a hydrogen concentration in the hydrogen tank based on the information regarding the concentration and charged quantity of hydrogen obtained from the wired or wireless communication device;
   estimating, by a controller, change in hydrogen concentration in the anode channel and impurity concentration therein on the basis of the estimated hydrogen concentration in the hydrogen tank and a crossover quantity of impurities; and
   determining, by the controller, whether the estimated hydrogen concentration in the anode channel has fallen below a predetermined reference value;
   in response to determining that the hydrogen concentration in the anode channel has fallen below a predetermined reference value, performing hydrogen purge by opening a valve for a predetermined length of time so that hydrogen and impurities are discharged to the outside, wherein the crossover quantity of the impurities comprises quantities of oxygen and nitrogen that are transmitted to the anode from the cathode.

10. The method of claim 9, wherein estimating the change in hydrogen concentration in the anode channel and impurity concentration further comprises calculating the impurity concentration ($C_{im}$) according to the impurity concentration ($\alpha$) using an equation defined by $$C_{im} = \frac{m_{im\text{-}an} + \alpha A \int i\, dt + \int \dot{m}_{im\text{-}co}\, dt}{m_{H_2\text{-}an} + m_{im\text{-}an}}$$

wherein the equation is obtained by setting an entirety of the anode channel as a single control volume.

11. The method of claim 9, wherein the hydrogen purge is performed until the impurity concentration in the anode channel is reduced below the lower limit of reference value ($\epsilon$), and when the impurity concentration in the anode channel is reduced below a lower limit of reference value, the hydrogen purge valve is closed to stop the hydrogen purge.

12. The method of claim 9, wherein when the impurity concentration in the hydrogen tank is higher than a reference value for impurities, hydrogen purge cycles are increased in proportion to the impurity concentration in the hydrogen.

* * * * *